(12) United States Patent
Muller

(10) Patent No.: US 8,830,178 B2
(45) Date of Patent: Sep. 9, 2014

(54) ILLUMINATABLE KEYBOARD

(75) Inventor: Karl-Heinz Muller, Auerbach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 199 days.

(21) Appl. No.: 13/016,124

(22) Filed: Jan. 28, 2011

(65) Prior Publication Data
US 2011/0193784 A1    Aug. 11, 2011

(30) Foreign Application Priority Data

Feb. 8, 2010 (DE) .......................... 10 2010 001 653

(51) Int. Cl.
*G06F 3/02* (2006.01)
*G09G 5/00* (2006.01)
*H01H 13/83* (2006.01)
*H01H 13/705* (2006.01)
*H01H 9/18* (2006.01)

(52) U.S. Cl.
CPC ........ *G06F 3/0202* (2013.01); *H01H 2219/056* (2013.01); *H01H 13/83* (2013.01); *H01H 13/705* (2013.01); *H01H 2209/038* (2013.01); *H01H 9/182* (2013.01); *H01H 2219/06* (2013.01); *H01H 2239/014* (2013.01)
USPC ............................ 345/170; 345/168; 345/169

(58) Field of Classification Search
None
See application file for complete search history.

(56) References Cited

U.S. PATENT DOCUMENTS

| | | | |
|---|---|---|---|
| 4,772,769 A | 9/1988 | Shumate | |
| 5,521,345 A | 5/1996 | Wulc | |
| 5,711,588 A | 1/1998 | Rudisill | |
| 6,224,221 B1* | 5/2001 | Glienicke | 362/23 |
| 6,429,853 B1* | 8/2002 | Chou | 345/168 |
| 7,129,930 B1* | 10/2006 | Cathey | 345/168 |
| 7,244,899 B2* | 7/2007 | Jung et al. | 200/314 |
| 7,283,066 B2* | 10/2007 | Shipman | 341/22 |
| 7,411,142 B2* | 8/2008 | Jung et al. | 200/314 |
| 8,063,326 B2* | 11/2011 | Igarashi et al. | 200/314 |
| 2003/0113531 A1* | 6/2003 | Hajmrle et al. | 428/327 |
| 2009/0121904 A1 | 5/2009 | Liu et al. | |
| 2009/0173610 A1 | 7/2009 | Bronstein et al. | |

FOREIGN PATENT DOCUMENTS

| | | |
|---|---|---|
| DE | 195 35 160 A1 | 9/1995 |
| DE | 196 49 889 C1 | 10/1997 |
| DE | 103 03 447 B3 | 12/2004 |
| DE | 20 2007 007 116 U1 | 10/2007 |
| WO | 2006/134574 A2 | 12/2006 |

* cited by examiner

*Primary Examiner* — Alexander Eisen
*Assistant Examiner* — Nan-Ying Yang
(74) *Attorney, Agent, or Firm* — Davis & Bujold, PLLC; Michael J. Bujold

(57) ABSTRACT

A keyboard that can be illuminated comprises a key array and a base element. Key buttons of the key array are held in modules arranged on a side, facing away from either the base element or a printed circuit board that is provided for delivering signals. The printed circuit board is arranged above the base element in a place close to but at a distance away from the base statement and made at least partially light-transmitting. At least one light source for emitting light is arranged on the underside of the printed circuit board that faces the base element. At least one light-scattering elements, which projects from the base element toward the printed circuit board, is arranged on the side of the base element facing the printed circuit board.

9 Claims, 2 Drawing Sheets

ILLUMINATABLE KEYBOARD

This application claims priority from German patent application serial no. 10 2010 001 653.5 filed Feb. 8, 2010.

FIELD OF THE INVENTION

The present invention concerns an illuminatable keyboard.

BACKGROUND OF THE INVENTION

In the prior art numerous keyboards are known, the term 'keyboard' including, besides alphanumerical keyboards, in the present context also for example PIN-pads or exclusively numerical keyboards. As a rule a keyboard has a key array formed of keys in order to provide for a user, for example, the possibility of effecting inputs to a device coupled to the keyboard, such as a communication means.

In the prior art illuminatable keyboards of this type are also known, which make it possible to effect a correct input under difficult visual conditions, for example in the dark. For this purpose such illuminatable keyboards comprise lighting means for example arranged inside the keyboard, so as to light up the key surfaces made to be partially light-transmitting, or the key array as a whole.

An illuminatable keyboard of this type, which is described in the document DE 20 2007 007 116 U1, provides lighting means in the casing such that light scattering to illuminate the key surfaces of the keyboard is achieved by means of an area that transmits light applied over a light-blocking surface, the keys themselves being arranged on a transparent printed circuit board arrangement. In this arrangement the light-transmitting zone also has, for example, light-concentrating reinforcements, in particular under the keys. This arrangement requires a considerable number of light sources in order to provide good illumination of the keyboard.

SUMMARY OF THE INVENTION

Starting from there, the purpose of the present invention is to propose an illuminatable keyboard which overcomes the drawbacks of the prior art and enables good illumination with a small number of light sources, along with low costs.

The invention proposes an illuminatable keyboard with a key array and a base element, such that key buttons of the key array are held in modules which are arranged on the side of a printed circuit board, provided for signal output, that faces away from the base element, such that the printed circuit board is arranged over the area of the base element close to but a distance away from the base element, the printed circuit board being made at least partially light-transmitting, and on the underside of the printed circuit board facing toward the base element, a light source for emitting light is arranged, and on the side of the base element facing toward the printed circuit board, at least one light-scattering element is provided, which projects from the base element in the direction from the base element toward the printed circuit board.

In an embodiment of the illuminatable keyboard according to the invention, the at least one light-scattering element is arranged opposite a light source, in particular overlapping the light source in the direction from the base element toward the printed circuit board.

In another embodiment of the illuminatable keyboard according to the invention, the light source is arranged, relative to a light-scattering element positioned under it, in such manner that its central axis extending in the direction from the printed circuit board toward the base element and a central axis of the light-scattering element extending perpendicularly to the base element intersect, in particular at the end of the light-scattering element facing toward the printed circuit board, or the central axes coincide.

In a further embodiment of the illuminatable keyboard according to the invention, the at least one light-scattering element is in the form of a cone-shaped scattering element or a scattering element in the shape of a truncated cone.

In still another embodiment of the illuminatable keyboard according to the invention, the at least one light source is designed or arranged so as to radiate light in the direction from the printed circuit board toward the base element.

According to one aspect of the illuminatable keyboard according to the invention, the surface of the base element facing toward the printed circuit board is at least partially textured, in order to scatter light.

According to another aspect of the illuminatable keyboard according to the invention, the printed circuit board has opaque printed areas to prevent light penetration through the printed circuit board.

According to the invention an illuminatable keyboard is also proposed, wherein an opaque printed area and/or a light source is fixed on the printed circuit board in the area of the projection of a key surface on the printed circuit board, in particular under a module.

In an embodiment of the illuminatable keyboard according to the invention, an opaque printed area is provided on the printed circuit board in an area under the intermediate space between adjacent key surfaces of the key buttons.

In still another embodiment of the illuminatable keyboard according to the invention, the base element is in the form of the lower part of a casing, in particular a keyboard casing.

Other features and advantages of the invention emerge from the description given below, of example embodiments of the invention, with reference to the figures in the drawings which show details that are essential to the invention and found in the claims. The particular features can in each case be implemented individually or several at a time in any desired combination in variants of the invention.

BRIEF DESCRIPTION OF THE DRAWINGS

Preferred embodiments of the invention are explained in more detail below with reference to the attached drawings, which show.

DETAILED DESCRIPTION OF THE PREFERRED EMBODIMENTS

In the description below and the drawings, the same indexes are used for elements having the same or a comparable function.

Figure 1:
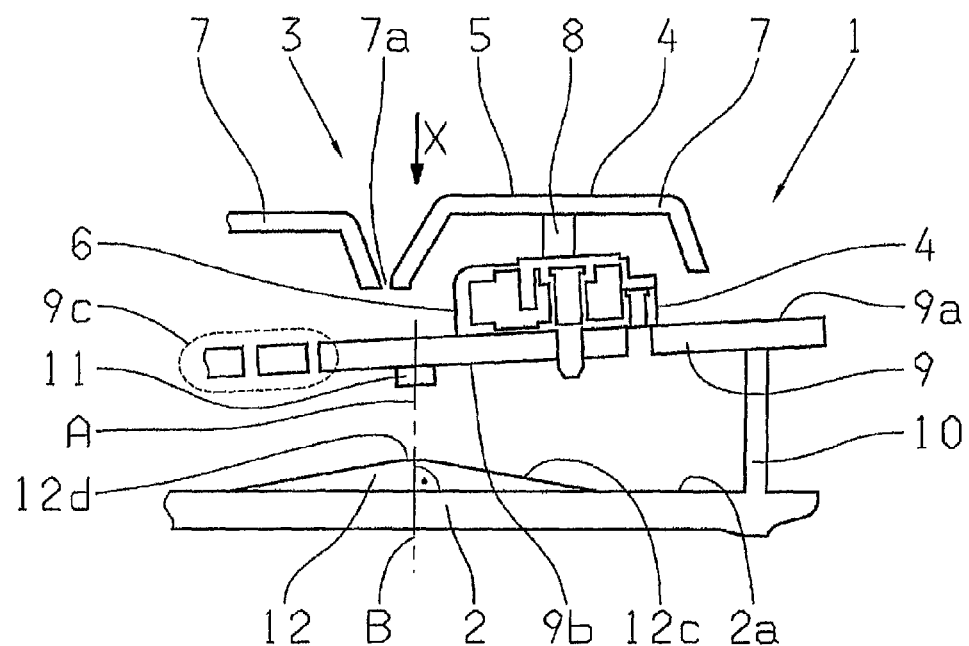
FIG. 1: As an example, a cross-section through an illuminatable keyboard according to one possible embodiment of the invention.

As an example, FIG. 1 shows a sectional view of an illuminatable keyboard 1 according to the invention. The keyboard 1 is for example an alphanumerical keyboard, a numerical keyboard or a PIN-pad for the input of sensitive data. The illuminatable keyboard 1 serves for example to enable interaction between a user and an apparatus such as a communication device, a data processing device or some other unit that receives operator inputs. The keyboard 1 can be part of the apparatus or device, i.e. it can be an integrated keyboard, or it can be a stand-alone device.

The illuminatable keyboard 1 comprises a base element 2 which, in the case of a stand-alone keyboard 1, can be the lower part of a casing that with an upper casing part, together forms a casing, in particular, a keyboard casing, or for example in the case of an integrated keyboard 1, forms a carrying or supporting element for further components. The base element 2 can be formed as a recessed shell or it can be flat, in particular planar.

Arranged over the base element 2 is a key array 3 consisting of keys 4 that can be actuated in a known manner by pressing in the direction of the base element 2. The keys 4 are formed by key buttons 5 each guided in a module 6. In the present case a key button 5 consists of a key surface 7 and a shaft 8 which, extends into the module 6 and is preferably guided therein in the key actuation direction X envisaged without distorting interference and non-detachably, for example in a guide. One or more key surfaces 7 can be made at least partially transparent so that legible symbols on the key surface can be made visible for a user by background illumination. It is also conceivable to make the key surfaces 6 opaque and to light up or illuminate only an intermediate space 7a between adjacent key surfaces 7 of the illuminatable keyboard 1.

According to the invention, the key module or module 6 is a mechanical switch element, for example with a single-pole contact, which can have a very small height. The key module 6 can be a moving mechanism which enables a key to be actuated. Each key module 6 co-operates with the key button 5 held in it and, for example, with a printed circuit board 9 for the production of a keyboard signal or output signal as the result of key actuation. The module 6, which can be a Cherry-ML key module, is arranged on the printed circuit board 9 to form part of the key array 3 by means of a plug-in or detent connection, a soldered joint, or some other known interlocked, material-integral or frictional connection method and combinations thereof, such that it can form an electrical contact with a conducting track of the printed circuit board 9.

The printed circuit board 9, which in this case is in particular an inflexible or rigid printed circuit board made for example from a synthetic resin, extends axially in a plane close to the base element 2, in particular a distance away therefrom and above it so that there is some free space between the base element 2 and the printed circuit board 9. In other words the printed circuit board 9 is positioned between the key array 3 and the base element 2 substantially in a horizontal direction. The printed circuit board 9 serves to deliver the keyboard signals in particular to an evaluation unit that can be connected to it, i.e. for the production of signals.

The printed circuit board 9 is supported for example on support elements 10 that extend from the base element 2 to the underside 9b of the printed circuit board 9. The printed circuit board 9 extends for example substantially parallel or plane-parallel to the base element 2, although an arrangement slightly inclined relative to one another is also possible. In particular, relative to the base element 2 the printed circuit board 9 is arranged so that the modules 6 on the printed circuit board 9 are attached to the side thereof that faces away from the base element 2, namely its upper side 9a.

In the present case the printed circuit board 9 is at least partially transparent or translucent. This can be achieved by making the printed circuit board without additional solder-resistant lacquer or copper layers and, for example, making it from FR4 or some other translucent material such as a polymer, for example with a layer of ITO (indium-tin-oxide) for forming the conducting tracks. For example, the printed circuit board 9 consists only of the basis material and the conducting tracks arranged on it, and can then have a transparent greenish appearance.

To produce the illuminatable keyboard 1 according to the invention, in this case the printed circuit board 9 has at least one and in particular a plurality of light sources 11 arranged on it, each in the form of an LED, a glass fiber lighting means, etc. The at least one light source 11, which can for example be supplied with electrical energy for producing the light by the printed circuit board itself or from an independent device, is arranged on the underside 9b of the printed circuit board 9 that faces toward the base element 2, i.e. directly on the printed circuit board 9 itself or if necessary indirectly, such that at least one light source 11 can be part of a lighting device. In this case it is provided that at least one light source 11 is arranged or designed in such a manner that the light it produces can shine downward, i.e. toward the base element 2, in particular only in this direction.

According to the invention, in order to achieve uniform illumination of the illuminatable keyboard 1 using a small number of light sources 11, the base element 2 has at least one and in particular a plurality of light-scattering elements 12 each projecting from the base element 2 in the direction toward the printed circuit board 9, for example in the free space between the base element and the printed circuit board 9. The at least one light-scattering element 12 is in each case formed as an individual elevated area rising from the side 2a of the base element 2 that faces toward the printed circuit board 9, i.e. its upper surface 2a. The light-scattering element 12 is provided in order to scatter light emitted by the light source 11 on the underside 9b of the printed circuit board 9, i.e. to deflect it in various directions. In particular the light-scattering element 12 is designed to scatter or deflect the light emitted by a plurality of light sources 11 at the same time. For example, the aim is to achieve a scatter angle such that the light emitted from the light source 11 can reach the printed circuit board 9. For that purpose the light-scattering element 12 can be arranged opposite the light source 11, in particular under it, i.e. overlapping it in the direction from the base element 2 toward the printed circuit board 9. In that case, relative to a light-scattering element 12 positioned under it the light source 11 can be directed or arranged in such a manner that its central axis A extending in the direction from the printed circuit board 9 toward the base element 2 or in the key actuation direction X and a central axis B of the light-scattering element 12 that extends perpendicularly to the base element 2 (see FIG. 1) intersect at the end 12d of the light-scattering element 12 close to the printed circuit board 9, or the central axes A, B coincide, i.e. coaxially.

According to the invention, the light-scattering element 12 that extends upward from the base element 2 is for example a conical scattering element 12a, a truncated-cone-shaped scattering element 12b or a suitable scattering element 12 of some other design. In the case of the conical 12a or truncated-cone 12b scattering element, the light-scattering element 12 is in particular arranged on the base element 2 in such a manner that its cross-section tapers in the direction toward the printed circuit board 9, such that a conical element 12a or a truncated-conical element 12b has a flat conical shape. For example, the light-scattering element 12 has a scattering surface 12c formed as a shell surface. The light-scattering element 12 or conical or truncated-cone scattering element 12a or 12b respectively can then, for example, have a textured surface or shell surface such as a beveled, regularly or irregularly textured surface, etc., and then deviations from an ideal cone or truncate-cone shape are allowable. The light-scattering element 12 can be made of the same material as the base element 2, for example a metal or a plastic, or from a material different from it. In particular, the light-scattering elements 12 serve the sole purpose of scattering light.

To illuminate the illuminatable keyboard 1 by means of the arrangement of at least one light source 11 and at least one light-scattering element 12 according to the invention, for example the light coming from the light source 11 is shone toward the light-scattering element 12. By virtue of the scattering, the light scattered by the light-scattering element 12 can now pass through the at least partially transparent printed circuit board 9 from the below and illuminate part of the key array 3 from underneath, for example a key surface 7 or an area 7a between the keys, For that purpose the light-scattering elements 12 can be formed over important parts of the surface 2a of the base element 2 or in individual areas thereof, for example only at discrete points. The light-scattering elements 12 can have various dimensions (such as small and large diameters) or shapes (such as pointed or truncated cones). The light-scattering elements 12 can be arranged on the base element 2 in a regular or irregular formation.

Figure 4:
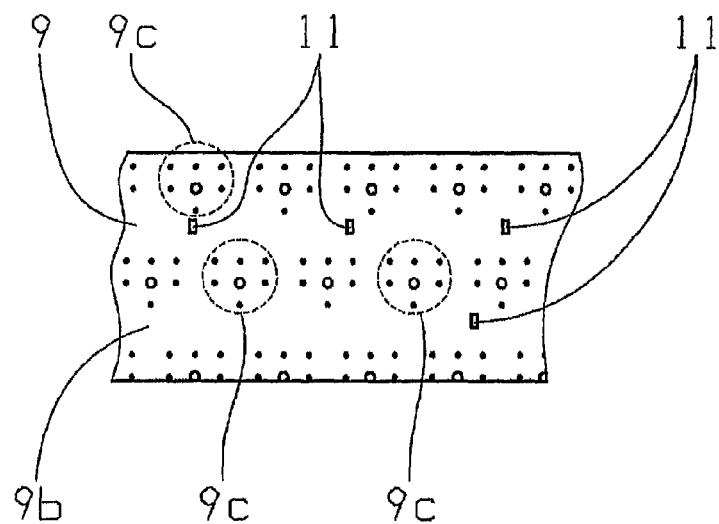
FIG. 4: As an example, a section of a printed circuit board according to the invention provided with light sources, seen in plan view from below, according to a further possible embodiment of the invention.

A possible arrangement of the light sources 11 on the underside 9b of the printed circuit board 9 is shown as an example in FIG. 4, in which the holders for respective modules 6 arranged on the upper side 9a of the printed circuit board 9 are each indexed 9c. In this example a plurality of light sources 11 are uniformly arranged in a regular manner on the underside 9b of the printed circuit board 9 with a constant spacing, although an irregular arrangement is also conceivable.

To light up the illuminatable keyboard 1, in addition, at least part of the surface 2a of the base element 2 can be light-scattering, for example by being textured, in particular between the light-scattering elements 12 or outside them, in order to improve the scattering of the light brought about by the light-scattering elements 12, i.e. to deflect a larger fraction of the light emitted from each light source 11 back to the printed circuit board 9. Such texturing can for example be produced by embossing the surface 2a of the base element 2, by scoring it or in some other manner such as coating it or bonding a textured foil on it. The texturing may be regular or irregular.

Figure 2:
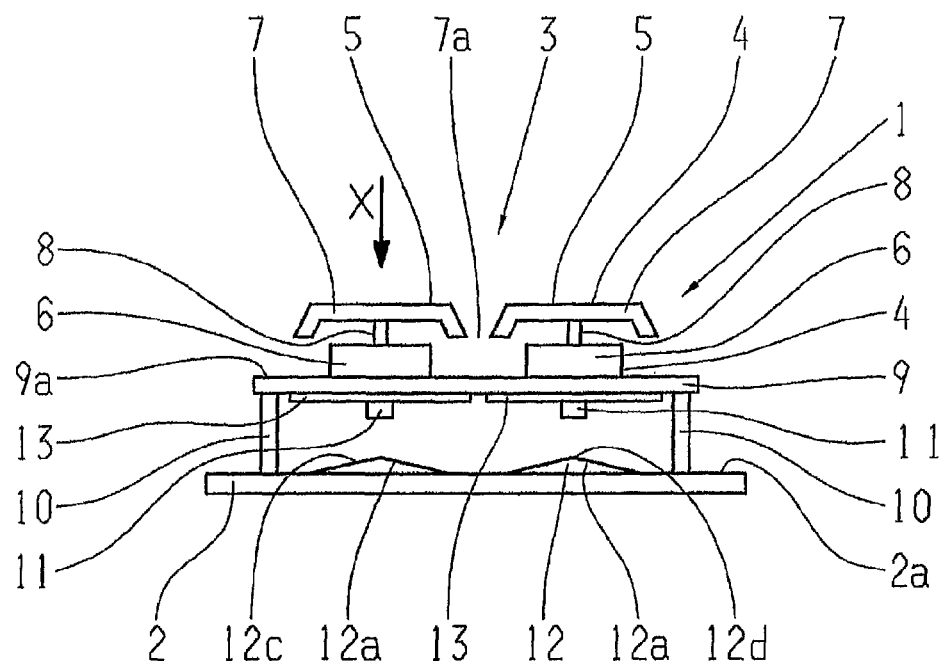
FIG. 2: As an example, a cross-section through an illuminatable keyboard according to another possible embodiment of the invention.
Figure 3:
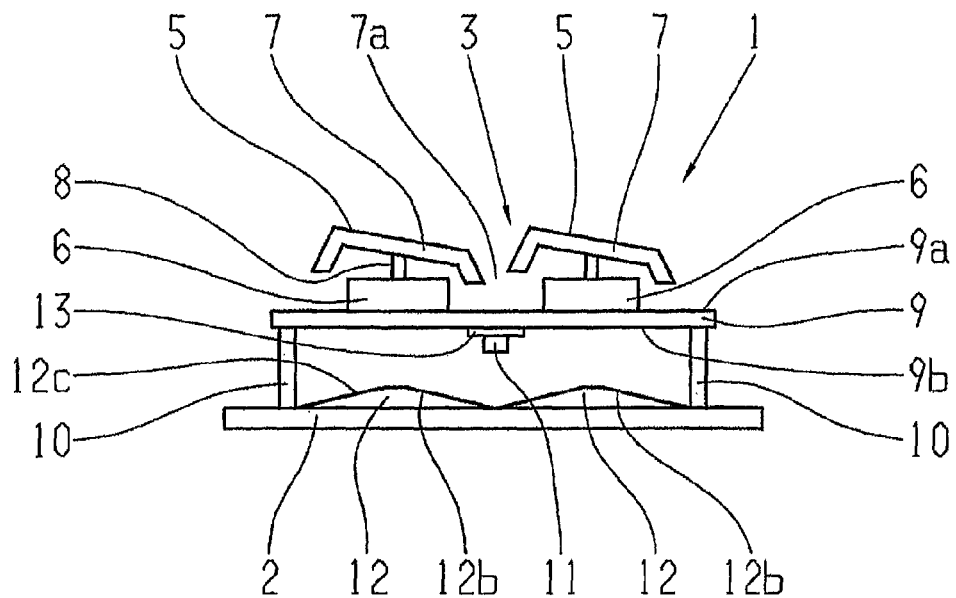
FIG. 3: As an example, a cross-section through an illuminatable keyboard according to a further possible embodiment of the invention.

To be able to light up parts of the illuminatable keyboard 1 selectively, some surface areas of the printed circuit board 9 or the printed circuit board 9 can be opaque, for example on the upper side 2a and/or the underside 9b where no passage of light is desired. This can be done for example by printing onto the printed circuit board. FIGS. 2 and 3 show possibilities for such a formation of opaque areas 13 or printing. In particular, the opaque areas 13 serve the sole purpose of preventing undesired passage of light.

FIG. 2 shows an illuminatable keyboard 1 in which the intermediate spaces 7a between adjacent key surfaces 7 are to be illuminated in the direction from the base element 2 toward the printed circuit board 9. For this an opaque printed area 13 is formed on the printed circuit board 9 within the projection of the key surfaces 7 onto the printed circuit board 9, for example under a module 6, so that a zone between the projection edges, i.e. under the intermediate spaces 7a, is left transparent. In this arrangement a light source 11 is arranged, for example, in each case within the boundaries of each opaque area 13 so formed in each case under a module 6. The opaque area 13 prevents the scattered light from shining under the key surfaces 7 through the printed circuit board 9, whereas there is illumination in the intermediate spaces 7a between the key surfaces 7.

FIG. 3 shows an illuminatable keyboard 1 in which the aim is to illuminate key surfaces 7 while the area between two adjacent key surfaces 7 remains dark. For this, an opaque area 13 is formed under the intermediate spaces 7a between adjacent key surfaces 7, for example by printing onto the printed circuit board 9, whereas the area under the key surfaces 7 remains for example translucent. The light, emitted for example by the one light source 11 shown and/or by other light sources 11 arranged according to the invention, and then scattered, can shine laterally past the opaque area 13 and under the key surface 7 in order to light it up. For example, the light source 11 is again arranged under the opaque area 13 laterally offset relative to a module 6. In such a case it is conceivable for example to make the modules 6, parts of the key buttons 5 or the key array 3 also transparent, in order to provide good lighting strength for illuminating the key surfaces 7.

Indexes

1 Illuminatable keyboard
2 Base element
2a Upper surface of base element
3 Key array
4 Key
5 Key button
6 Module
7 Key surface
7a Intermediate space
8 Shaft
9 Printed circuit board
9a Upper side of printed circuit board
9b Underside of printed circuit board
9c Holders
10 Support element
11 Light source
12 Light-scattering element
12a Conical scattering element
12b Truncated-cone scattering element
12c Scattering surface
12d End of a scattering element
13 Opaque area
A, B Axes

The invention claimed is:
1. An illuminatable keyboard (1) with a key array (3) and a base element (2),
wherein key buttons (5) of the key array (3) are held in respective distinct modules (6), each key button comprises a key surface and a shaft, the key surface defines a key plane and the shaft defines a key actuation axis, the modules directly and continuously contact and are fixed to an upper side surface (9a) of a printed circuit board (9), the upper side surface faces away from the base element (2), and the printed circuit board (9) is provided for delivering signals,
the printed circuit board (9) being arranged above the base element (2) in close proximity to but spaced from the base element (2), and the printed circuit board (9) consists only of a translucent polymer and conducting tracks, a printing is printed onto an underside surface of the printed circuit board, the printing defines an opaque area, the opaque area being smaller than the underside surface of the printed circuit board, at least one light source (11), for emitting light, is fixed to the printing that is printed on the underside surface (9b) of the printed circuit board (9) facing the base element (2), the printing, which defines the opaque area, serving a sole purpose of preventing light from passing therethrough, and at least one light-scattering element (12), which projects from the base element (2) in a direction from the base element (2) toward the printed circuit board (9), is arranged on a surface (2a) of the base element (2) facing toward the printed circuit board (9), and the at least one light-scattering element (12) defines a central axis that extends through a peak end of the light-scattering element and is normal to the surface of the base element, and the light-scattering element is positioned opposite the at least one light source (11), such that the central axis of the at least one light-scattering element (12) and the key actuation axis are coaxial, and the at least one light source (11) is aligned with the shaft of the key button along the key actuation axis, and the printing being arranged on the underside surface of the printed circuit board so as to prevent light from passing from the light-scattering element along the central axis of the light-scattering element to the key button aligned along the corresponding key actuation axis.

2. The illuminatable keyboard (1) according to claim 1, wherein the at least one light-scattering element (12) is either a conical element (12a) or a truncated-cone element (12b), and when viewed in cross section the at least one light-scattering element has lateral side surfaces that meet each other at a point on the key actuation axis and the lateral side surfaces are at an angle of between 90 and 180 degrees with respect to each other.

3. The illuminatable keyboard (1) according to claim 1, wherein the printing has first and second surfaces, the first surface of the printing overlays the underside surface of the printed circuit board, and the second surface of the printing is opposite the first surface of the printing and the at least one light source is directly supported on the second surface of the printing, and the at least one light source (11) emits light in a direction from the printed circuit board (9) toward the base element (2), such that in order, along an actuation direction of the key, the module is fixed directly to the printed circuit board which overlays the printing which directly contacts the at least one light source.

4. The illuminatable keyboard (1) according to claim 1, wherein the surface (2a) of the base element (2), facing toward the printed circuit board (9) supports the at least one light-scattering element, and the surface (2a) of the base element (2) outside the at least one light-scattering element is at least partially textured to facilitate scattering of light, the surface of the base element outside the at least one light-scattering element comprising at least one of scoring, coating and a textured foil bonded thereto.

5. The illuminatable keyboard (1) according to claim 1, wherein the opaque area (13) only functions to prevent light from passing from the light-scattering element along the key actuation axis to the key button.

6. The illuminatable keyboard (1) according to claim 1, wherein the printing defines a plurality of opaque areas and is fixed directly to the underside surface of the printed circuit board (9), each of the plurality of opaque areas is arranged in an area of a projection of the key surface (7) onto the printed circuit board (9) under the module (6), and is aligned with the key actuation axis, the central axis of the light scattering element and the light source, the plurality of opaque areas are spaced from each other such that light passes centrally between the key actuation axes and centrally between and past the key surfaces of adjacent key buttons and is prevented from passing along the key actuation axes and through the key buttons.

7. The illuminatable keyboard (1) according to claim 1, wherein the base element (2) is a lower casing portion of a casing, the key actuation axis (X) is normal to the surface of the base element facing toward the printed circuit board, and the light-scattering element is conical and is fixed to the surface of the base element facing toward the printed circuit board such that a peak of the conical light-scattering element, the opaque area and the light source are coaxially aligned on the key actuation axis such that light is prevented from passing along the key actuation axis and through the key surface.

8. An illuminatable keyboard (1) comprises:
an array (3) of key buttons (5), each of the key buttons comprises a key surface and a shaft, the key surface defines a plane and the shaft defines a key actuation axis, the shafts of the key buttons are supported in respective individual modules (6) which directly contact and are fixed to an upper surface (9a) of a printed circuit board (9) which is provided for delivering signals, the printed circuit board(9) is planar and consists only of a translucent polymer and conducting tracks;
a planar base element (2) having at least one support element (10) which contacts a bottom surface (9b) of the printed circuit board (9) for supporting and spacing printed circuit board (9) away from the base element (2);
at least one opaque printing is printed on the bottom surface of the printed circuit board;
at least one light emitting source (11) being fixed to a bottom surface of the opaque printing opposite of the printed circuit board (9) and facing the base element (2), the opaque printing serving a sole purpose of preventing light from passing therethrough to the printed circuit board;
at least one light-scattering element (12) being supported on an upper surface (2a) of the base element (2) and facing the printed circuit board (9) for scattering light from the at least one light emitting source (11), and a peak of each of the at least one light-scattering element is coaxially aligned along a respective key actuation axis with a respective module; and
at least two opaque printings are printed on the bottom surface of the printed circuit board, the two opaque printings are separated from each other by a gap that is located in an area centrally between the key actuation axes of adjacent key buttons, at least two light-scattering elements are fixed to the upper surface of the base element facing toward the printed circuit board, the light-scattering elements are truncated-cone elements, the key actuation axes (X) are normal to the upper surface of the base element facing toward the printed circuit board, at least two light sources are supported by the two opaque printings that are printed onto the bottom surface of the printed circuit board, and the at least two light-scattering elements are fixed to the upper surface of the base element facing toward the printed circuit board such that peaks of the at least two light-scattering elements are coaxially aligned along a respective one of the key actuation axes, and the at least two light sources and the respective printings are coaxially aligned along a respective one of the key actuation axes such that light emitted from the at least two light sources reflects off the at least two light-scattering elements and passes through the printed circuit board in the area centrally located between the key actuation axes of the adjacent key buttons, the printings are arranged and only function so as to prevent light from passing therethrough along the key actuation axes through the printed circuit board and to the key buttons such that the light passes the key buttons in the area centrally located between the key actuation axes.

9. An illuminatable keyboard (1) comprises:

an array (3) of key buttons (5), each of the key buttons comprises a key surface and a shaft, the key surface defines a plane and the shaft defines a key actuation axis, the shafts of the key buttons are supported in respective individual modules (6) which directly contact and are fixed to an upper surface (9a) of a printed circuit board (9) which is provided for delivering signals, the printed circuit board (9) is planar and consists only of a translucent polymer and conducting tracks;

a planar base element (2) having at least one support element (10) which contacts a bottom surface (9b) of the printed circuit board (9) for supporting and spacing the printed circuit board (9) away from the base element (2);

at least one opaque printing is printed on the bottom surface of the printed circuit board;

at least one light emitting source (11) being fixed to a bottom surface of the opaque printing opposite of the printed circuit board (9) facing the base element (2), the opaque printing serving a sole purpose of preventing light from passing therethrough to the printed circuit board;

at least one light-scattering element (12) being supported on an upper surface (2a) of the base element (2) and facing the printed circuit board (9) for scattering light from the at least one light emitting source (11), and a peak of each of the at least one light-scattering element is coaxially aligned along a respective key actuation axis with a respective module; and the printed circuit board defines a circuit board plane and the at least one support element that extends normal to the base element supports the printed circuit board such that the planes of the key surfaces are at an oblique angle, that is nonparallel and nonperpendicular, with respect to each of the key actuation axis, the circuit board plane, the base element, and a central axis of the at least one light scattering element, the central axis extending normal to the base element and through the peak of the at least one light-scattering element.

* * * * *